United States Patent
Greiner et al.

[15] 3,704,028
[45] Nov. 28, 1972

[54] FARM WAGON FRAME

[72] Inventors: James G. Greiner, Leola; John E. Brelsford, Terre Hill, both of Pa.

[73] Assignee: Sperry Rand Corporation, New Holland, Pa.

[22] Filed: March 22, 1971

[21] Appl. No.: 126,745

[52] U.S. Cl. ............................... 280/106 T, 280/140
[51] Int. Cl. ................................................ B62d 21/00
[58] Field of Search .......... 280/140, 143, 106, 106 T; 296/28 M, 43

[56] References Cited

UNITED STATES PATENTS 2,457,397  12/1948  Richards ................ 280/106 T
2,743,940  5/1956  Bohlen .................... 280/106 T Primary Examiner—Philip Goodman
Attorney—John C. Thompson, Joseph A. Brown and James J. Kennedy

[57] ABSTRACT

A farm wagon frame having a high strength to weight ration and including front and rear axle still assemblies interconnected by side rail members. The side rail members are formed in a specific manner to support wagon stakes in such a manner that they do not project beyond the sides of the vehicle and also to support the wagon floor supports in such a manner that the weight on the floor supports is not transmitted in shear to the axle sill assembly.

10 Claims, 7 Drawing Figures

PATENTED NOV 28 1972 3,704,028

INVENTOR.
JAMES G. GREINER
JOHN E. BRELSFORD
BY John C. Thompson
ATTORNEY

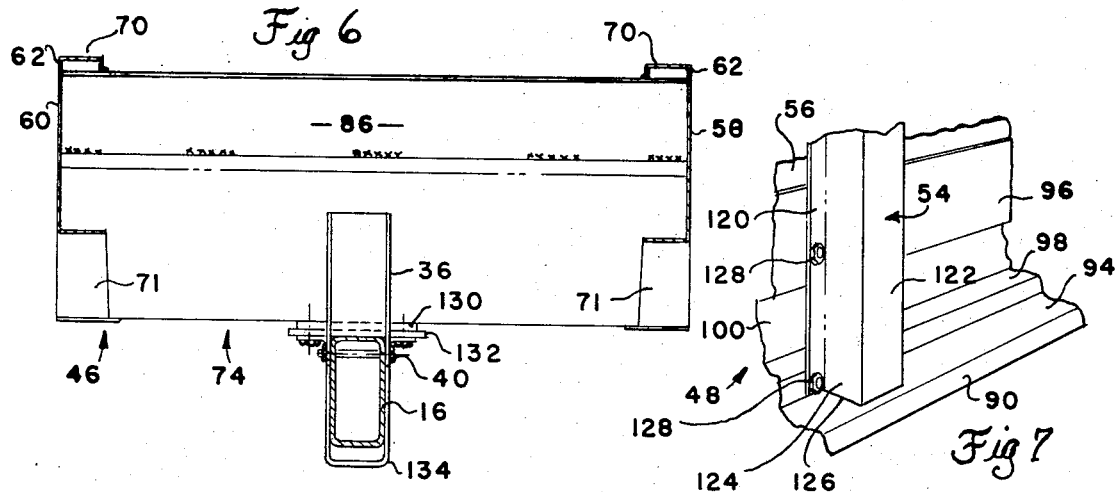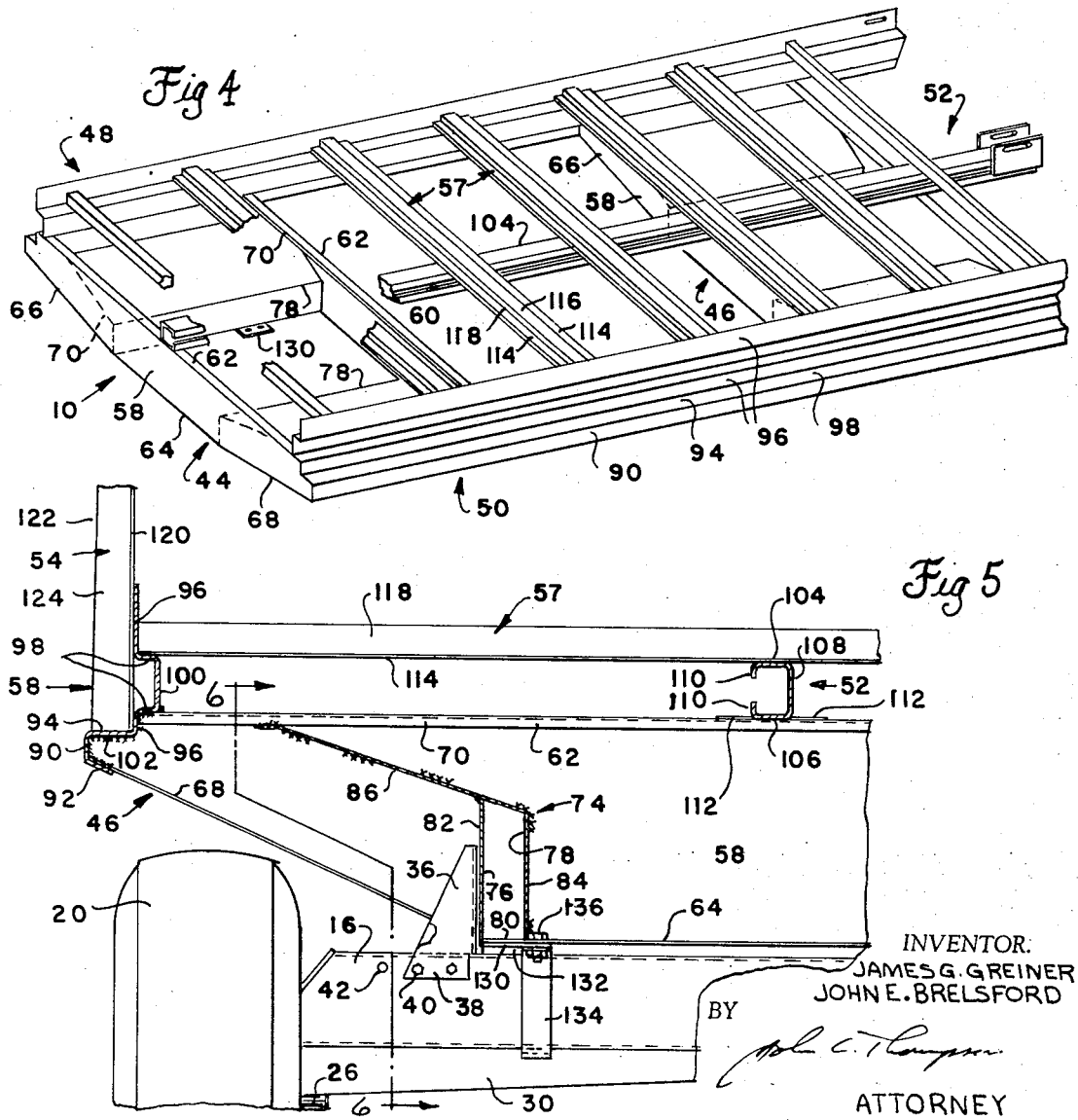

FARM WAGON FRAME

FIELD OF THE INVENTION

The present invention relates generally to agricultural machinery and more particularly to a farm wagon frame construction of novel design having an improved strength to weight ratio.

BACKGROUND OF THE INVENTION

Most farm wagons of today consist of two separately marketed items, the running gear, and the farm wagon box or frame. As a result of this marketing practice virtually all farm wagon frames or boxes are designed so that they can be mounted on a conventional running gear. A conventional running gear consists of front and rear axles (the rear axle may be tandem) interconnected with each other by a generally tubular reach pole. Axle stakes are mounted on the upper surfaces of the axle and the farm wagon frame is secured in some manner or other to the axle stakes. The most wisely used farm wagon construction of today employs two long sill members which extend between the front and rear axles and upon which transversely extending members are mounted for supporting the upper portion of the wagon. It is further generally conventional to interconnect the ends of the transverse members with longitudinally extending side rails upon which wagon stakes are bolted.

OBJECTS OF THE INVENTION

It is a principal object of this invention to provide a farm wagon frame having a higher strength to weight ratio than prior art farm wagon frames.

It is a further object of this invention to provide a farm wagon frame construction in which the load imposed upon the floor of the farm wagon is transmitted to the axles without imposing any shearing forces upon the frame construction.

It is a further object of this invention to provide a frame wagon construction in which the side rails of the frame provide a support for the wagon stakes and which also acts as a rub bar to prevent unnecessary damage to the wagon stakes should the wagon encounter an obstruction along its side.

It is a further object of this invention to provide a farm wagon frame which may be mounted on a conventional running gear or directly upon axles which are not interconnected by a reach member, and which case the side rails will act as a draft transmitting member.

These and other objects and advantages of this invention will be apparent to those skilled in the art after a consideration of the following detailed description, taken in conjunction with the accompanying drawings in which a preferred form of this invention is illustrated.

BRIEF DESCRIPTION OF THE DRAWINGS

FIG. 4 is an isometric view of a portion of the farm wagon frame, this view being taken from the left front.

FIG. 5 is a sectional view taken generally along the lines 5—5 in FIG. 2, this view being in enlarged scale.

FIG. 6 is a sectional view taken along the lines 6—6 in FIG. 5.

FIG. 7 is a perspective view showing the manner in which the axle stakes are mounted on the side rails.

In the following description right-hand and left-hand reference is determined by standing to the rear of the farm wagon frame and facing the direction of travel.

Figure 2:
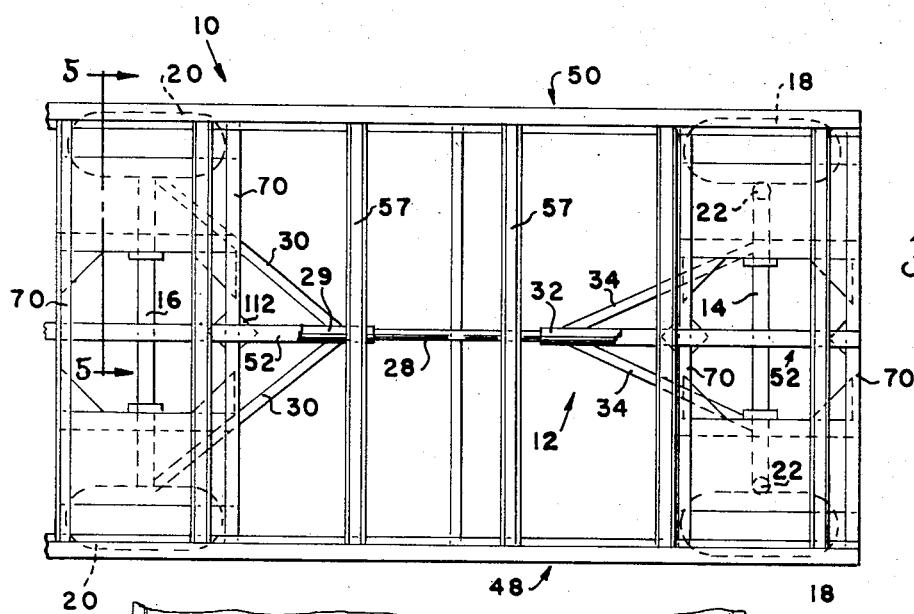
FIG. 2 is a plan view of the farm wagon shown in FIG. 1 mounted upon a running gear, the wagon being illustrated without a floor.

Referring now to the drawings, a farm wagon frame, indicated generally at 10, is shown mounted upon a conventional running gear, indicated generally at 12. The running gear includes front and rear axles 14,16, respectively, which in turn carry front and rear wheels 18,20 respectively at their outboard ends. To this end the front axle is provided with vertically extending spindles 22 (FIG. 2) which carry stub axles (not shown) at their lower ends to which the front wheels are secured. The spindles 22 are interconnected with a forwardly extending swingable tongue 24 in a conventional manner so that the front wheels 18 may be turned as the tongue is turned. The rear wheels are rotatably mounted on stub axles 26 (FIG. 3) secured to the lower outboard ends of the rear axle 16. The front and rear axles are interconnected with each other by a tubular reach 28, the rear portion being secured within a tubular member 29 which is in turn secured to the rear axle and braced by rear braces 30, the forward portion of the reach 28 being received within the tubular member 32 which is secured at its forward end to the axle 14 and which is braced by braces 34. The reach 28 may rotate slightly within the tubular member 32. Mounted on each of the axles are a pair of axle stakes 36. The axle stakes are generally U-section members when taken in horizontal cross sections and have front and rear dependent sides 38 (FIG. 5) which may be adjustably secured to the axle by bolts 40 which are adapted to pass through longitudinally extending apertures 42 in the associated axle and corresponding apertures in the stakes 36.

The farm wagon frame of this invention consists generally of front and rear axle sill assemblies, 44,46, respectively, the front and rear axle sill assemblies being interconnected by right and left longitudinally extending side rails indicated generally at 48 and 50, respectively and also by an intermediate longitudinally extending member 52. Wagon stakes 54 are adapted to be secured to the side rails and extend upwardly therefrom, the wagon stakes in turn supporting the sides 56 of the wagon which are secure to the stakes in a conventional manner, as for example by bolting. Also supported on the side rails are transversely extending floor supports 57 which in turn support the floor of the wagon (not shown).

The axle sill assemblies, side rails, intermediate member, and wagon stakes are of special construction in order to provide a high strength to weight ratio. Each axle sill assembly includes front and rear generally trapezoidal members 58,60, respectively. Each trapezoidal member has generally parallel upper and lower edges 62,64, respectively and generally downwardly converging right and left side edges 66,68, respectively. The upper parallel edge portion 62 is formed into a channel shape 70 (shown in FIGS. 4 and 6) which acts as a transversely extending brace, and the side edges are formed into angle portions 71.

The front and rear trapezoidal members 58,60 are interconnected by right and left short sill members indicated generally at 72,74, (FIGS. 3, 5), respectively. Each short sill means includes a first L-shaped member 76 (FIG. 5) and a second L-shaped member 78. The first L-shaped member has a lower inwardly extending leg 80 and a generally vertically extending leg 82. The second L-shaped member has a vertically extending leg 84 and an upwardly and outwardly extending leg 86 which is welded to the upper edge of the leg 82 to the brace 70. The lower edge of the vertically extending leg 84 is welded to the inner edge of the inwardly extending leg 80 to form a generally rigid beam structure. The front and rear edges of the L-shaped members 76,78 abut the inner surfaces of the front and rear trapezoidal members 58,60, and are welded thereto. As can be appreciated from the foregoing this weld assembly has a generally high strength to weight ratio.

The right and left longitudinally extending side rails 48 and 50 are secured to the right and left sides of both the front and rear axle sill assemblies by welding. Each of the side rails is of a specific formed shape and includes a lower generally vertical portion 90 (FIG. 5) which is disposed immediately above a downwardly and inwardly extending bottom edge portion 92. Extending inwardly from the top of the lower generally vertical portion 90 is a lower generally horizontal inwardly extending portion 94. First and second upper generally vertical extending portions 96, which lie in the same vertical plane, are disposed above the inner edge of the lower generally horizontal inwardly extending portion 94, one of the first and second upward generally vertically extending portions 96 being interconnected with the lower generally horizontal inwardly extending portion 94. Extending inwardly from adjacent edges of the first and second upward generally vertically extending portion 96 are first and second upper horizontal portions 98 which are disposed inwardly of the upper vertical portions. An intermediate portion 100 extends between the inner edges of the first and second upper horizontal portions and serves to connect them to each other. In order to obtain a high strength to weight ratio, the entire longitudinal extending side rail is a unitary strip of formed metal. As previously noted the side rails are secured to the right and left hand edges of the axle sill assemblies by welding. When welded together the lower of the first and second upper horizontal portions 98 rests upon the transverse channel 70, and the lower horizontal portion 94 rests upon a horizontal end portion 102 of the trapezoidal member 58 or 60. In this way all the weight carried by the side rails is transmitted directly to the axle sill assemblies without any shear forces being imposed upon the welds which join these members together.

The intermediate member 52 is also a formed member and has upper and lower generally parallel horizontal portions 104 and 106, respectively. The upper and lower horizontal portions are interconnected to a vertical portion 108 at one side. The other sides of the portion 104–106 are bent towards each other to form angles to further rigidify the member 52, however it should be noted that these angle portions 110 do not join each other to permit torsional twisting of the member 52. The intermediate member is welded to the front and rear axle sill assemblies, and to this end gussets 112 (FIG. 2) are provided, the lower horizontal surface 106 being welded to the gussets 112, and the gussets 112 in turn being welded to the channel portion 70.

The transversely extending floor supports 57 are preferably of "hat" cross section having lower horizontal portions 114 (FIG. 4), an upper horizontal portion 116, and interconnecting vertical portions 118. The lower horizontal portions 114 are disposed upon the uppermost first and second upper horizontal portions 98 and are secured thereto by welding or the like. In practice it is not desirable to secure the members 57 to the longitudinally extending member 52 to facilitate twisting of the farm wagon frame about a longitudinally extending axis. At this point it should be noted that in the design of a farm wagon frame it is necessary to permit such twisting. In the use of a farm wagon it is customary to propel the wagon over uneven terrain, and as the axle structures of the running gear rock with respect to each other about a longitudinally extending axis, it is necessary for the wagon frame to adapt itself to the rocking motion of the axles. The floor supports 57 receive on their upper horizontal portion 116 the floor of the wagon which may be of wood, and which is not shown in these drawings. However, it should be noted that any load imposed upon the floor is transmitted directly to the floor supports 57 which in turn transmit this load to the horizontal surface 98 of the side rails or to the horizontal portion 104 of the longitudinally extending member 52. By utilizing this design again no welds are placed in shear and all loads imposed upon the floor are transmitted directly to the axle sill assemblies without passing through any joined areas in shear.

Figure 3:
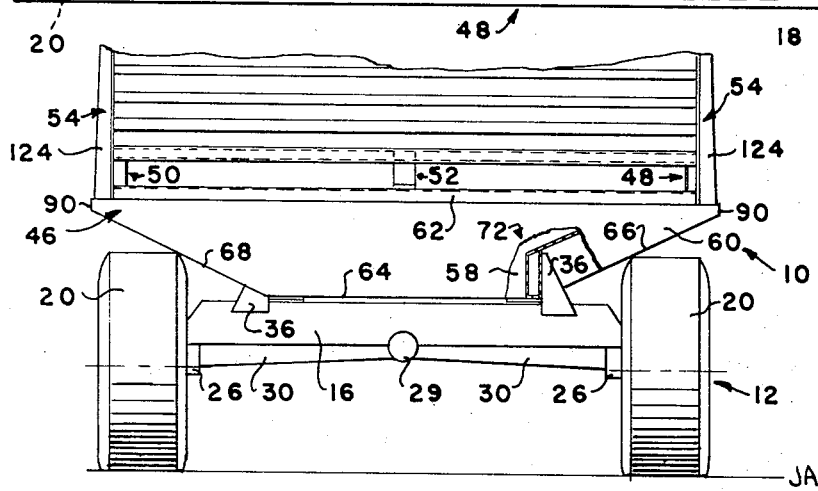
FIG. 3 is a rear view of the farm wagon shown in FIGS. 1 and 2.

The wagon stakes 54 are also of "hat" section and include inner and outer longitudinally extending surfaces 120,122, respectively (FIG. 7) which are interconnected by transversely extending portions 124, these portions tapering upwardly and inwardly as can best be seen from FIG. 3. The bottom edge 126 (FIG. 7) of the transversely extending portions is formed at right angles to the plane of the longitudinally extending inner surfaces. When assembling the wagon stakes to the side rails 48,50 the bottom edge 126 is placed in contact with the lower generally horizontal surface 94 and fasteners 128 are passed through the inner portions 120 and secure the stakes to the first and second upper vertically extending surfaces 98 as can best be seen from FIG. 7. It should be noted that by employing this construction, particularly with the bottom edge abutting against the lower generally horizontal surface 94, any outward bowing forces imposed upon the stakes 54 by the load within the wagon is resisted by this abutting contact.

It should also be noted that the width of the transversely extending portions of the wagon stakes is less than the width of the lower generally horizontal surface 94. This permits the lower generally vertical surface 90 to act as a rub rail and serves to prevent the wagon stakes from being damaged should the farm wagon frame contact an obstruction along its sides.

To assemble the farm wagon frame of this invention upon a conventional running gear it is only necessary to place the short sill members 72,74 between the axle stakes 36. Inwardly extending aperture plates 130 are welded to the bottoms of all of the short sills and project inwardly therefrom. These plates 130 are so located that they are disposed above the axles 14 and 16 and a rubber member 132 is disposed therebetween, the rubber member, which may be in the form of a tire carcass, is secured to the plate 130 by bolts 136 or the like. The rear axle is further secured to the farm wagon frame by means of a U-strap 134 which passes around the axle 16 as can best be seen from FIG. 6. The U-strap is secured to the plate 130 by the same bolts 136 which are employed to secure the rubber member 132. At the front of the frame no straps 134 are employed and the farm wagon frame merely rests upon the rubber member 132 which in turn rests upon the axle 14, sidewise movement being limited by the axle stakes 36 and fore-and-aft movement being limited by the straps 134 at the rear of the vehicle. This form of mounting is desirable to permit the wagon to flex as the running gear passes over uneven terrain without imposing undue stresses on the wagon frame.

While the wagon frame has been illustrated as mounted on a conventional running gear it should be noted that in some situations it may be desirable to mount the axle sill assemblies directly on front and rear axles. If this is to be done, then each of the axle sill assemblies will be secured to their associated axles by straps 134 and the side rails 48,50 and the intermediate member 52 will act as draft transmitting members between the front and rear axles.

Figure 1:
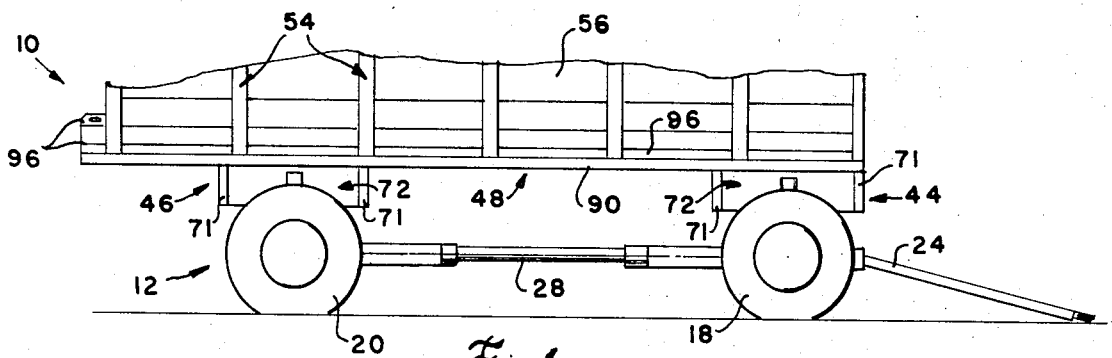
FIG. 1 is a side view of a farm wagon mounted upon a conventional running gear, this view, as well as the other views being drawn generally to scale.

In FIGS. 1 and 4 the side rail members 48,50 and intermediate member 52 are shown projecting to the rear of the wagon. In many instances it may be desirable to employ a conveyor upon the floor of the wagon in which case one run of the conveyor passes over the floor and the return run passes beneath the floor. A sprocket shaft may be mounted in a suitable slot in the rearmost portion of the side rails and intermediate member to facilitate the employment of such a conveyor.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described our invention, what we claim is:

1. In combination with a running gear having front and rear wheels rotatively mounted on front and rear axles, a reach member extending between the front and rear axles, and right and left axle stakes mounted on each of the axles; a farm wagon frame comprising:
    a plurality of pairs of transversely extending generally trapezoidal members, one pair for each axle, each member having generally parallel upper and lower edge portions and downwardly converging side edges,
    a plurality of pairs of right and left longitudinally extending short sill means, one pair for each axle, each pair of trapezoidal members being joined to each pair of short sill means to form a unitary axle sill assembly adapted to be disposed upon each axle between the axle stakes;
    right and left longitudinally extending side rails interconnecting right and left sides of the axle sill assemblies, each of the side rails having a lower generally vertical portion which serves as a rub rail, a generally horizontal inwardly extending portion, and an upwardly generally vertically extending portion; and
    a plurality of vertically extending wagon stakes secured to the side rails in generally abutting relationship to the horizontal inwardly extending portion and the upper generally vertically extending portion.

2. The invention set forth in claim 1 in which the upper edge portions of the trapezoidal members are formed into channels which act as transversely extending braces.

3. The invention set forth in claim 2 in which each of the right and left short sill means comprises a first and second L-shaped member disposed between the trapezoidal members, the first L-shaped member having a lower inwardly extending leg and a generally vertically extending leg, and the second L-shaped member having a vertically extending leg and an upwardly and outwardly extending leg, the upwardly and outwardly extending leg being secured to the vertically extending leg of the first L-shaped member and to the transversely extending braces.

4. In combination with a running gear having front and rear wheels rotatively mounted on front and rear axles, a reach member extending between the front and rear axles, and right and left axle stakes mounted on each of the axles; a farm wagon frame comprising:
    a plurality of axle sill assemblies, one for each axle, each assembly being adapted to be disposed upon an axle between the axle stakes;
    right and left longitudinally extending side rails interconnecting right and left sides of the axle sill assemblies each of the side rails having a lower generally vertically extending portion which serves as a rub rail, a lower generally horizontal inwardly extending portion, first and second upper generally vertically extending portions lying in the same vertical plane, first and second upper horizontal portions disposed inwardly of the upper generally vertical portions, and an intermediate portion between the first and second upper horizontal portions, one of the first and second horizontal portions being mounted upon the axle sill assembly; and
    a plurality of floor supports disposed upon the other of the first and second upper horizontal surfaces, whereby the load received upon the floor supports is not transmitted in shear to the axle sill assemblies.

5. The invention set forth in claim 4 in which an intermediate longitudinally extending member is disposed between the right and left side rails, the intermediate member having upper and lower generally parallel surfaces, the lower surface being disposed upon the axle sill assemblies, and the upper surface being adapted to support the floor supports.

6. The invention set forth in claim 5 in which only the rear axle sill assembly is secured to the rear axle, and in which the intermediate longitudinally extending member is welded to all of the axle sill assemblies, the longitudinally extending member being capable of torsional twisting whereby the farm wagon frame can flex as the running gear passes over uneven terrain.

7. The invention set forth in claim 4 in which a plurality of generally vertically extending wagon stakes are secured to the side rails in generally abutting relationship to the lower generally horizontal inwardly extending portion and the first and second upper generally vertically extending portions, the outer surface of said wagon stakes being disposed inwardly of said lower generally vertical portion which serves as a rub rail.

8. The invention set forth in claim 4 wherein each of the axle sill assemblies comprises right and left short sill means and a pair of generally trapezoidal members, each trapezoidal member having generally parallel upper and lower edge portions and downwardly converging sides, said trapezoidal members being joined to said right and left short sills to form a unitary axle sill assembly.

9. A farm wagon frame comprising:
a plurality of axle sill assemblies, each assembly being adapted to be disposed upon a wheeled axle;
right and left longitudinally extending side rails interconnecting right and left sides of said axle sill assemblies in draft transmitting relationships, each of said side rails having a lower generally vertically portion which serves as a rub rail, a lower generally horizontal inwardly extending portion, first and second upper generally vertically extending portions lying in the same vertical plane, first and second upper horizontal portions disposed inwardly of said upper generally vertical portions, and an intermediate portion between the first and second upper horizontal portions, one of the first and second horizontal portions being mounted upon the axle sill assembly,
a plurality of floor supports disposed upon the other of the first and second upper horizontal portions;
an intermediate longitudinally extending member disposed between the right and left side rails, the intermediate member having upper and lower generally parallel horizontal portions, the lower portion being secured to the axle sill assemblies in draft transmitting relationship, and the upper portion being adapted to support the floor supports, and
a plurality of generally vertically extending wagon stakes secured to the side rails in generally abutting relationship to the lower generally horizontal inwardly extending portion and the first and second upper generally vertically extending portions, the outer surface of said wagon stakes being disposed inwardly of said lower generally vertical portion.

10. The farm wagon frame set forth in claim 9 in which each of the axle sill assemblies comprises a pair of generally trapezoidal members, each trapezoidal member having generally parallel upper and lower edge portions and downwardly converging sides, the upper edge portion of the trapezoidal members being formed into a channel which acts as a transversely extending brace, said trapezoidal members being joined to right and left short sill means to form a unitary axle sill assembly, each of the right and left short sill means comprising a first and second L-shaped member disposed between the trapezoidal members, the first L-shaped member having a lower inwardly extending leg and a generally vertically extending leg, and the second L-shaped member having a vertically extending leg and an upwardly and outwardly extending leg, said upwardly and outwardly extending leg being secured to the vertically extending leg of the first L-shaped member and to the transversely extending braces.

* * * * *